United States Patent [19]
Eichenauer

[11] Patent Number: 5,062,757
[45] Date of Patent: Nov. 5, 1991

[54] LARGE ROUND BALE HANDLING APPARATUS

[76] Inventor: R. Dale Eichenauer, Rte. 1, Box 120, Ingalls, Kans. 67853

[21] Appl. No.: 547,602

[22] Filed: Jul. 2, 1990

[51] Int. Cl.⁵ ............................................. A01D 95/02
[52] U.S. Cl. .................................. 414/24.5; 414/501; 414/521; 414/470; 414/111; 298/1 A; 298/18
[58] Field of Search ............... 414/24.5, 25, 470, 501, 414/518, 551, 521, 525.1, 911; 298/1 A, 18

[56] References Cited

U.S. PATENT DOCUMENTS

| | | |
|---|---|---|
| 3,841,504 | 10/1974 | Spasuik . |
| 4,042,140 | 8/1977 | McFarland . |
| 4,043,461 | 8/1977 | Castro .......................... 414/525.1 X |
| 4,076,138 | 2/1978 | Honomichl, Sr. . |
| 4,103,794 | 8/1978 | Shaw .................................. 414/501 |
| 4,117,940 | 10/1978 | Adam . |
| 4,232,986 | 11/1980 | Johnson . |
| 4,249,842 | 2/1981 | Johnson . |
| 4,261,676 | 4/1981 | Balling, Sr. ...................... 414/501 X |
| 4,329,102 | 5/1982 | Gray . |
| 4,508,359 | 4/1985 | Campbell et al. . |
| 4,580,843 | 4/1986 | Lund . |
| 4,685,856 | 8/1987 | Hesse, Jr. ......................... 414/521 X |
| 4,718,806 | 1/1988 | Chambers . |
| 4,878,635 | 11/1989 | Nordstrom ..................... 414/521 X |
| 4,909,694 | 3/1990 | Peters et al. ..................... 414/501 X |

FOREIGN PATENT DOCUMENTS

| | | |
|---|---|---|
| 2585534 | 2/1987 | France ............................... 414/24.5 |
| 2620300 | 3/1989 | France ............................... 414/24.5 |

Primary Examiner—Robert J. Spar
Assistant Examiner—Craig Slavin
Attorney, Agent, or Firm—John R. Flanagan

[57] ABSTRACT

A large round bale handling apparatus has a mobile frame with a pair of laterally-spaced longitudinal beams which can receive and support large round bales end-to-end in a row with their axes generally aligned and extending parallel to the beams. The apparatus also has a bale pickup mechanism, a bale pushing mechanism, and a bale unloading mechanism, each mounted to the mobile frame. The bale pickup mechanism is pivotally mounted adjacent the front and along one side of the mobile frame for movement between horizontal bale-engaging and upright bale-discharging positions. The bale pushing mechanism is supported at the front end of the mobile frame for reciprocal movement through rearward working and forward return strokes to move each bale deposited onto the forward portion of the frame by the pickup mechanism through a distance greater than the axial length of the bale allowing transfer of succeeding bales form the pickup of the frame and rearward movement thereof until a row of end-to-end bales has been accumulated on the longitudinal beams of the frame. The bale onloading mechanism is pivotal between lowered and tilted raised positions about a longitudinal axis extending parallel to and along one of the longitudinal beams for lifting and rolling off one side of the mobile frame over the one of the longitudinal beams thereof the row of accumulated bales to concurrently discharge the bales from the longitudinal beams of the mobile frame.

16 Claims, 4 Drawing Sheets

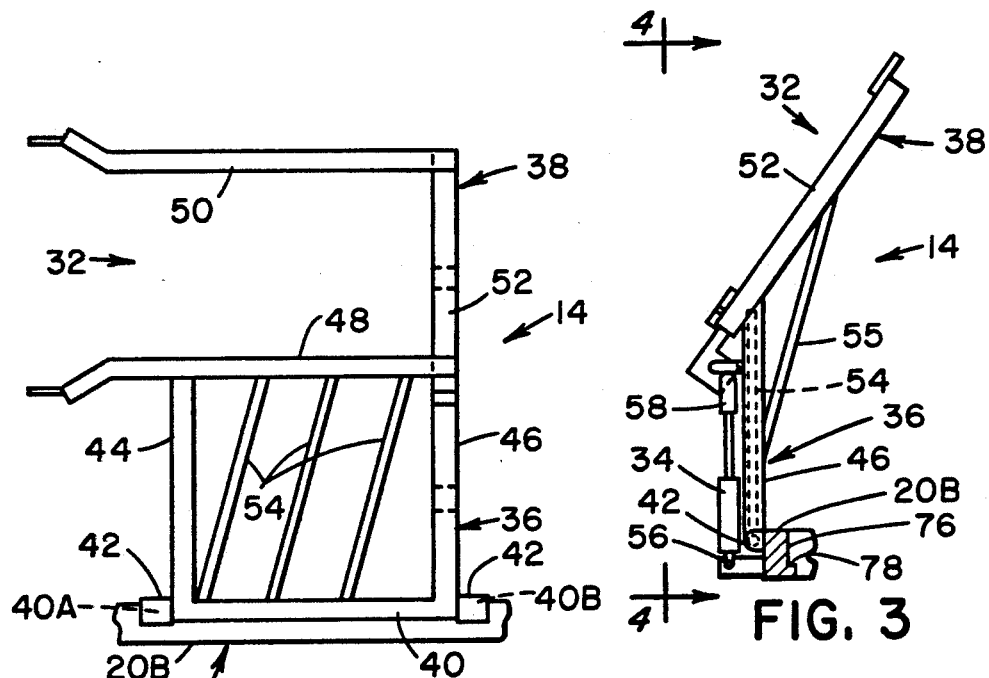
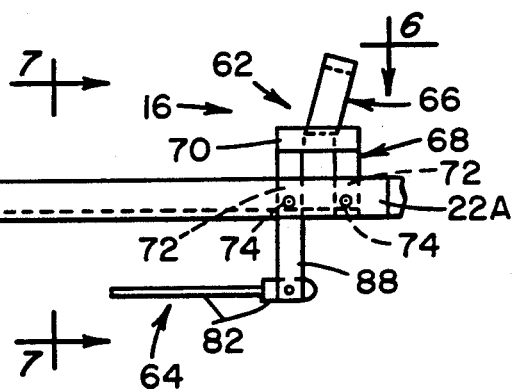
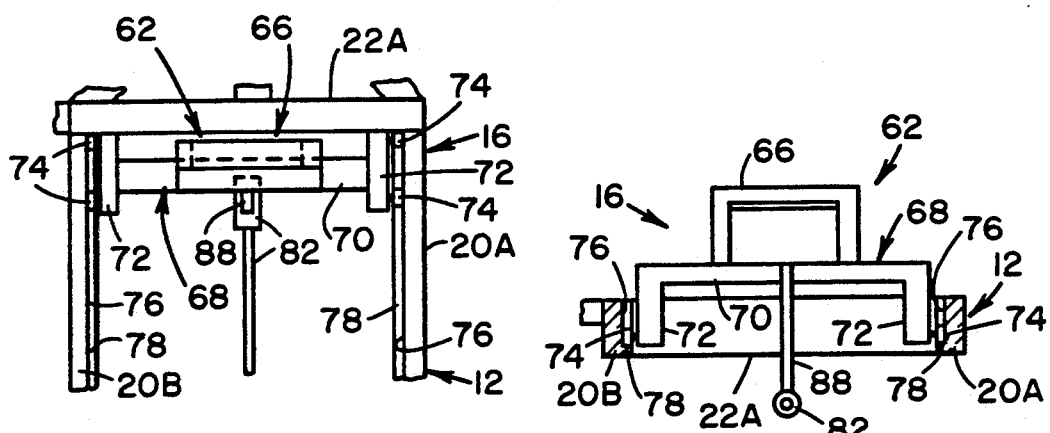
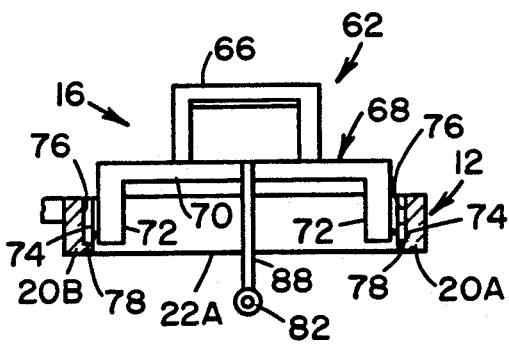

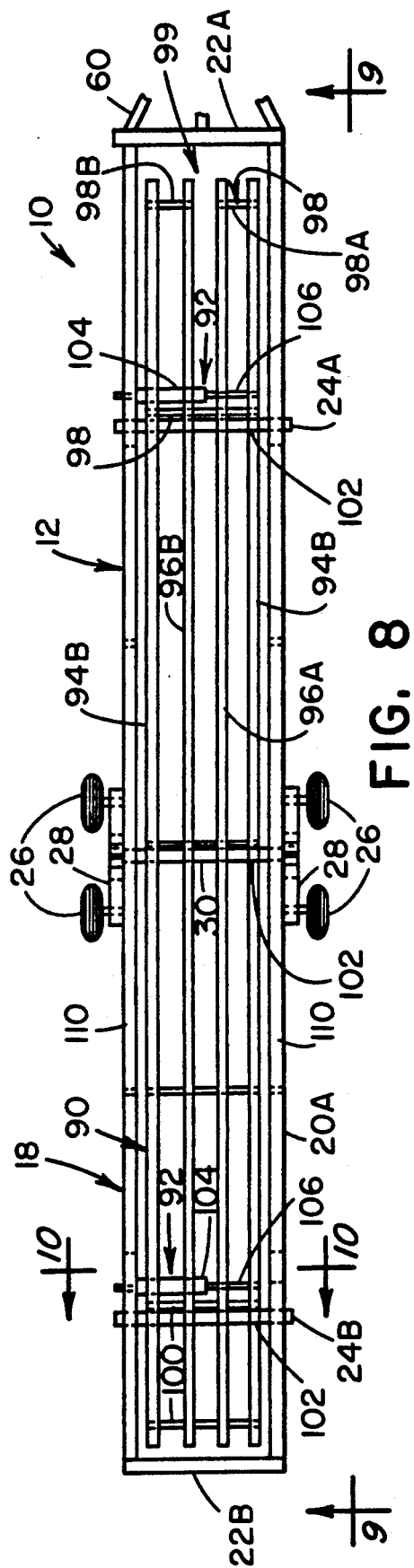
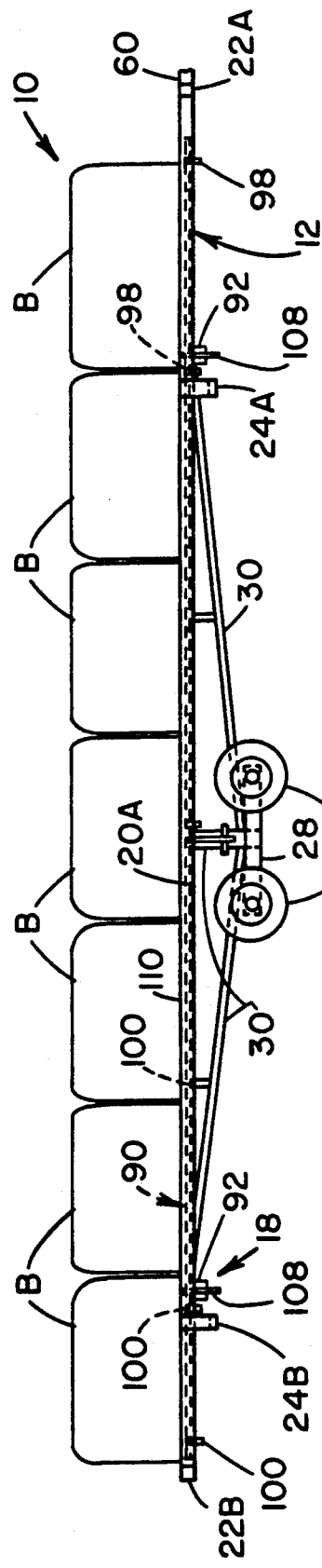

LARGE ROUND BALE HANDLING APPARATUS

BACKGROUND OF THE INVENTION

1. Field of the Invention

The present invention generally relates to art of handling crop material and, more particularly, is concerned with an apparatus and method for handling crop material packages such as large round bales of hay.

2. Description of the Prior Art

For many years the predominate method of harvesting crop material such as hay or the like in the United States and many other countries was by formation of hay into small rectangular bales. In this method, the previously cut and windrowed hay is continuously picked up and formed into the wire- or twine-tied small rectangular bales using an automatic baler. These small rectangular bales normally range in weight from approximately 50 to 125 pounds. However, for a variety of reasons, such as the scarcity and increasing cost of hay harvesting labor, an alternative method of harvesting hay came into use more than a decade ago and has grown in popularity until it has substantially replaced the small rectangular bales in many hay harvesting regions of the country.

This alternative method utilizes a hay roll forming machine, generally referred to as a large round baler, to pick up loose windrowed hay or the like and form it into a large round roll or bale normally ranging in weight from approximately 600 to 1500 pounds and in axial length and diameter from approximately 4 to 6 feet. The success of this alternative method is in part due to the acceptable moisture shedding and weathering attributes of the large round bale when it is left resting in the field. Such attributes eliminate the necessity for immediate removal of large round bales from the field after they have been formed and deposited there by the baler. Small rectangular bales generally require removal the same or next day in order to protect such bales from the sudden onset of inclement weather which frequently occurs in most regions of the country during the hay harvesting season.

Such attributes of large round bales eliminate the need for the farmer to devote immediate attention to handling large round bales to remove them from the field and thereby allow removal, if desired, at a later time during slack periods. However, the large size of large round bales requires that efficient handling methods be devised in order to make the large round bale method feasible as a one-man hay harvesting and handling system for the farmer. Since the size of such bales do not lend themselves to being handled by the manual labor of several persons, let alone one man, some mechanical apparatus for handling them must be provided.

Single large round bale handling units currently available, such as three-point hitch, tractor mounted rear end loaders and tractor mounted front end loaders, are believed to be adequate for a farmer that has just a few bales to move. However, such units are uneconomical and inefficient for farming operations where large numbers of these bales must be removed from the field, transported to distant feedlots or storage areas and further handled at such locations in carrying out livestock feeding operations.

Heretofore, various prior art apparatuses have been proposed and employed for loading, transporting and unloading these large round bales. Exemplary prior art apparatuses are described and illustrated in U.S. Pat. Nos. to Spasuik (3,841,504), McFarland (4,042,140), Honomichl, Sr. (4,076,138), Adam (4,117,940), Johnson (4,232,986 and 4,249,842), Gray (4,329,102), Campbell et al (4,508,359), Lund (4,580,843) and Chambers (4,718,806). Certain of these apparatuses, such as the ones disclosed by the Honomichl, Sr., Adam and Chambers patents, advantageously employ an elongated frame formed of laterally-spaced longitudinally-extending guide rails or channels upon a forward end of which the bales are placed and then moved toward the rear end of the frame until multiple large round bales are accumulated in a row on the apparatus.

However, the apparatuses of these patents employ features which penetrate into the crop material of the bales in order to either move the bales along the guide rails or retain them at their displaced positions once moved there. For example, in the Honomichl, Sr. patent, a moving conveyor chain is employed having hooks or pins which extend outwardly to penetrate and engage the bale in order to advance the bales in the rearward direction along the guide rails with movement of the conveyor chain. In the Adams and Chambers patents, biased dogs are employed which pivot and project outwardly to penetrate and retain the bales once they have been moved in the rearward direction to the displaced position.

Because of recurring drought conditions in many regions of the country the price of crop material such as hay has continued to increase making hay a significant cash crop. As a result, there is a growing trend toward application of plastic covers to large round bales to further enhance preservation of the crop material. A major drawback of the apparatuses of these patents is that the same features on them which penetrate the large round bales in order to move them or retain them once moved will also produce tearing of the plastic covers used for covering the bales, thereby reducing the ability of the covers to shed moisture from the round bales.

Consequently, a need still exists for an apparatus which will effectively handle large round bales without penetrating and tearing their plastic covers.

SUMMARY OF THE INVENTION

The present invention provides a large bale handling apparatus and method designed to satisfy the aforementioned needs. Unlike the prior art apparatuses, the large round bale apparatus of the present invention employs a mobile frame having a pair of generally parallel laterally-spaced longitudinal beams with upper surfaces which receive and support the bales and permit sliding of bales rearwardly without obstruction by anything, such as stops or pivotal dogs, that might penetrate into the bales and cause tearing of plastic covers applied around the bales.

Also, in the apparatus of the present invention, the large round bale rests directly on the longitudinal beams of the mobile frame as they are pushed rearwardly by a movable bale pushing mechanism at the front of the apparatus. In contrast thereto, in the prior art apparatus of the chambers patent, the bale rests upon the horizontal legs of a movable bale pushing mechanism and not directly on the longitudinal beams of the apparatus.

Further, unlike the prior art apparatuses, the large round bale apparatus of the present invention employs a bale unloading mechanism having a longitudinal lift gate. The lift gate is pivotal about a longitudinal axis extending parallel to and along one of the longitudinal beams for lifting and rolling off one side of the apparatus all of the bales resting in the row on the longitudinal beams of the mobile frame.

Accordingly, the present invention is directed to a large round bale handling apparatus which comprises: (a) a mobile frame with a pair of laterally-spaced longitudinal beams for receiving and supporting large round bales end-to-end in a row; (b) a bale pickup mechanism pivotally mounted to the mobile frame adjacent the front and along one side thereof and operable for undergoing movement between a lower bale-engaging position and an upright bale-discharging position; (c) a bale pushing mechanism movably supported at the front end of the mobile frame and operable for undergoing reciprocal movement through rearward working and forward return strokes to move each bale deposited onto the forward portion of the frame by the pickup mechanism through a distance greater than the axial length of the bale allowing transfer of succeeding bales from the pickup to the frame and rearward movement thereof until a row of end-to-end bales has been accumulated on the longitudinal beams of the frame; and (d) a bale unloading mechanism pivotally mounted to the mobile frame and operable for undergoing pivotal movement between a lowered position underlying the row of bales on the frame and a tilted raised position about an axis extending parallel to and along one of the longitudinal beams for lifting and rolling off one side of the mobile frame over the one of the longitudinal beams thereof the row of accumulated bales to concurrently discharge the bales from the longitudinal beams of the mobile frame.

Also, the present invention is directed to a large round bale handling method, comprising the steps of: (a) picking up and depositing large round bales one at a time onto a pair of generally parallel, laterally-spaced, longitudinal beams of a mobile frame; (b) pushing each deposited bale along the beams of the frame through a distance greater than the axial length of the bale for allowing picking up and depositing of succeeding bales onto the longitudinal beams of the frame until a row of end-to-end bales has been accumulated thereon; and (c) unloading the row of accumulated bales from the longitudinal beams of the frame so as to discharge the bales all at the same time therefrom. The unloading is carried out by lifting and rolling the row of accumulated bales off one side of the mobile frame over one of the longitudinal beams thereof.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 3 is a rear end elevational view of the bale pickup mechanism of the apparatus in the raised position as seen along line 3—3 of FIG. 2.

FIG. 4 is a left side elevational view of the bale pickup mechanism as seen along line 4—4 of FIG. 3.

FIG. 5 is an enlarged fragmentary right side elevational view of a forward portion of the apparatus of FIG. 2 illustrating a bale pushing mechanism.

FIG. 6 is a top plan view of the bale pushing mechanism as seen along line 6—6 of FIG. 5.

FIG. 7 is a rear end elevational view of the bale pushing mechanism as seen along line 7—7 of FIG. 5.

FIG. 8 is a top plan view, on a reduced scale, of the apparatus of FIG. 1, illustrating a bale unloading mechanism of the apparatus with the bale pickup and pushing mechanisms being omitted.

FIG. 9 is a right side elevational view of the apparatus as seen along line 9—9 of the FIG. 8.

DETAILED DESCRIPTION OF THE INVENTION

In the following description; right hand and left hand references are determined by standing at the rear of the apparatus and facing in the direction of forward travel. Also, in the following description, it is to be understood that such terms as "forward," "left," "upwardly," etc., are words of convenience and are not to be construed as limiting terms.

Figure 1:
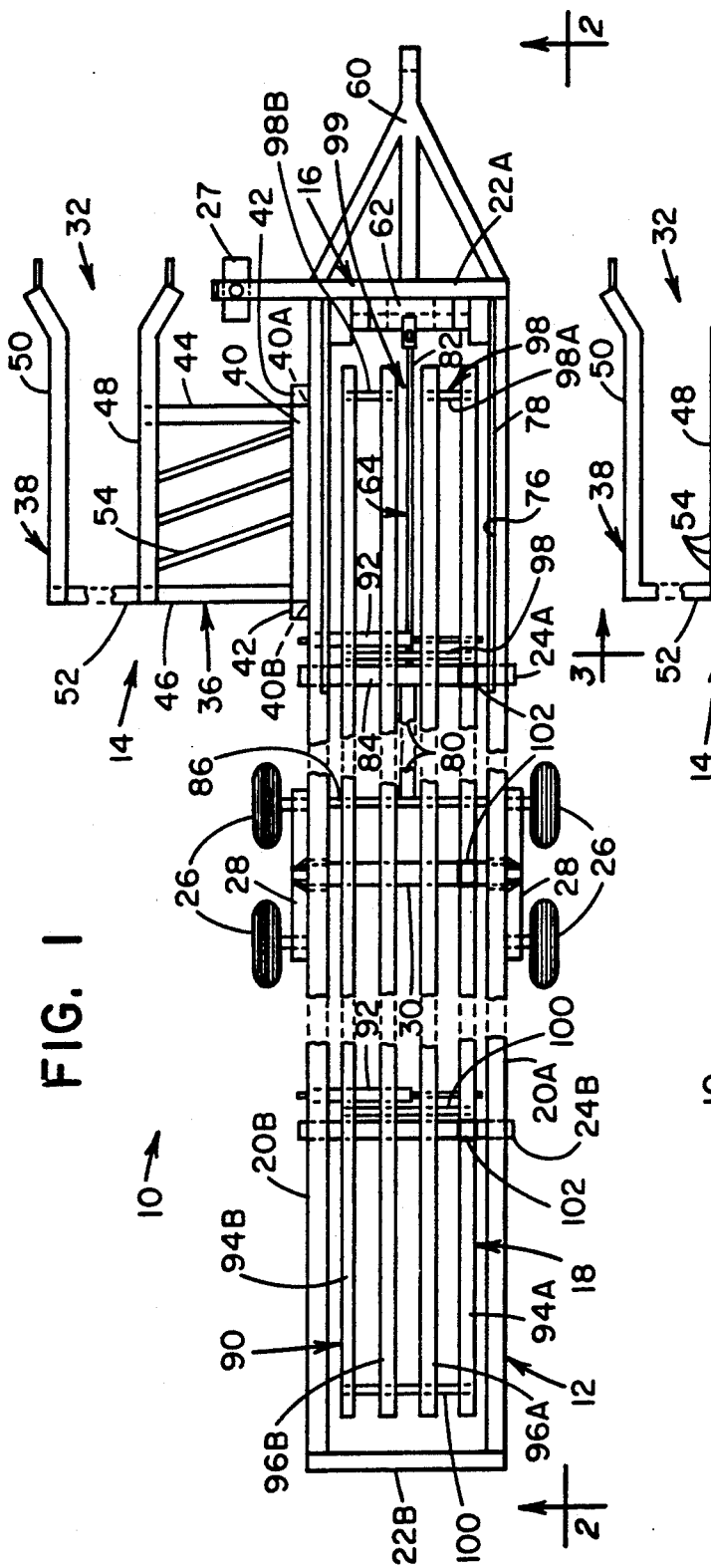
FIG. 1 is a top plan view of an large round bale handling apparatus of the present invention, illustrating a bale pickup mechanism of the apparatus in a lowered position.
Figure 2:
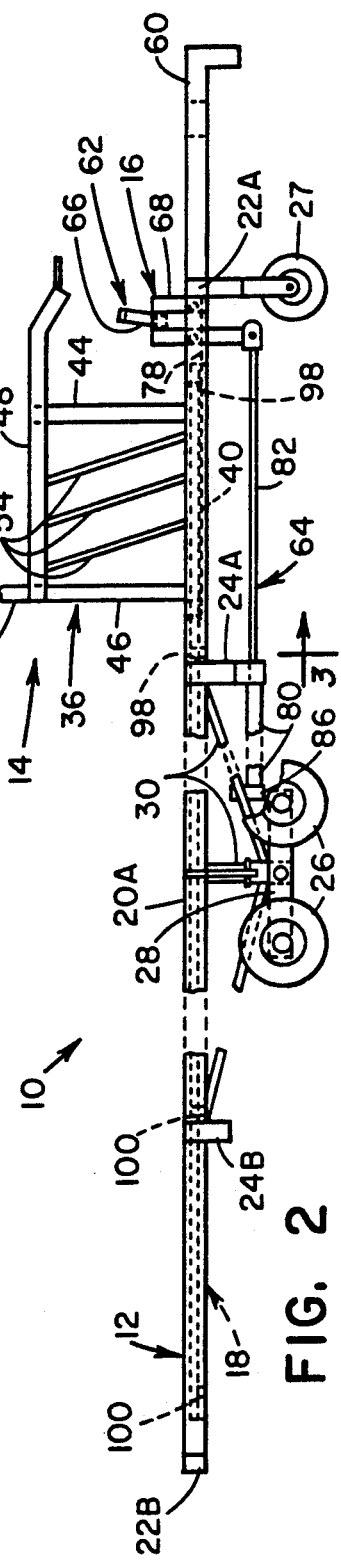
FIG. 2 is a right side elevational view of the apparatus as seen along line 2—2 of FIG. 1, but showing the bale pickup mechanism of the apparatus in a raised position.
Figure 10:
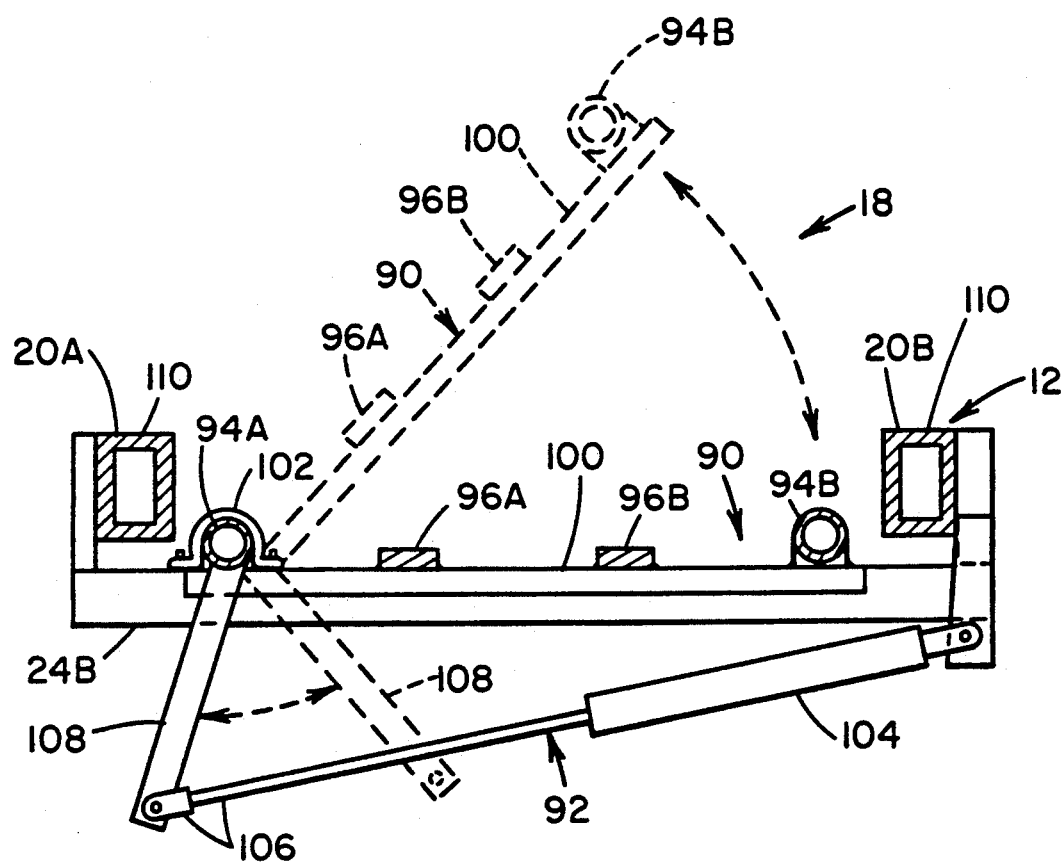
FIG. 10 is a sectional view of the bale unloading mechanism taken along line 10—10 of FIG. 8.

Referring to the drawings, and particularly to FIGS. 1 and 2, there is shown a large round bale handling apparatus of the present invention, generally designated 10. In its basic components, the large round bale handling apparatus 10 includes an elongated mobile frame 12, a bale pickup mechanism 14, a bale pushing mechanism 16, and a bale unloading mechanism 18.

As shown in FIGS. 1, 2, 8 and 9, the elongated mobile frame 12 of the apparatus 10 is composed of a pair of laterally-spaced longitudinally-extending right and left beams 20A, 20B which will receive and support large round bales B, as shown in FIG. 9, aligned end-to-end in a row with their axes aligned and running parallel to the beams 20A, 20B. The longitudinal beams 20A, 20B are rigidly interconnected at their opposite ends by front and rear end beams 22A, 22A and at locations spaced from the opposite ends toward the middle of the frame 12 by front and rear cross beams 24A, 24B.

The elongated frame 12 is supported by a pair of tandemly arranged ground engaging wheels 26 disposed along each opposite side of the frame 12 at the middle thereof and an outrigger wheel 27 at the front left corner of the frame 12. The tandem wheels 26 are rotatably mounted to opposite ends of rocker arms 28 pivotally connected to reinforced undercarriage structures 30 rigidly attached to and extending downwardly from the underside of the longitudinal beams 20A, 20B of the frame 12.

Referring to FIGS. 1–4, the bale pickup mechanism 14 of the apparatus 10 is pivotally mounted adjacent the front and along one side of the mobile frame 12. More particularly, the bale pickup mechanism 14 basically includes a pickup 32 and an actuator 34. The pickup 32 is composed of an inner ramp-defining structure 36 and an outer bale-supporting structure 38 rigidly attached to and extending outwardly from the inner structure 36.

The inner ramp-defining structure 36 of the pickup 32 includes a shaft 40 extending along a forward and outer side of the left longitudinal beams 20B of the mobile frame 12. The shaft 40 is rotatably mounted at its front and rear ends 40A, 40B by a pair of cylindrical sleeves 42 attached to the outer side of the left longitudinal beam 20B. The inner ramp-defining structure 36 also includes spaced front and rear frame members 44, 46 rigidly connected to the shaft 36 and extending outwardly in transverse relation thereto.

The outer bale-supporting structure 38 of the pickup 32 has a generally U-shaped configuration being made up of a pair of fore-and-aft extending and laterally spaced inner and outer tine bars 48, 50 rigidly attached to an end bar 52 and to the frame members 44, 46. A plurality of reinforcing bars 54 interconnect the inner tine bar 48 with the shaft 40. The reinforcing bars 54 are slanted to connect with the shaft 40 at a more forward location than that where they connect with the inner tine bar 48. The slanted relation of the bars 54 ensures that a bale being transferred from between the tine bars 48, 50 onto the front portion of the longitudinal beams 20 of the frame 12 will tend to move forwardly as the bales slides laterally across the slanted bars 54 of the inner ramp-defining structure 36 of the pickup 34 onto the forward portion of the longitudinal beams 20A, 20B of the mobile frame 12. A brace 55 rigidly interconnects the end bar 52 with the rear frame member 46 of the pickup 32.

The actuator 34 of the bale pickup mechanism 14 is preferably an extendible and retractible hydraulic cylinder extending between and pivotally connected at a cylinder end 56 to the left longitudinal beam 20B and at a piston rod end 58 to the pickup 32. The piston rod end 58 is pivotally connected to the rear of the inner tine bar 48. The pickup 32 is pivotally movable by selected operation of the actuator 34.

Retraction of the actuator 34 pivots the pickup 32 downwardly, lowering the tine bars 48, 50 onto the ground with the pickup 32 then at a generally horizontal bale-engaging position. In such position, the spaced tine bars 48, 50 can be inserted under a large round bale lying in the field as the mobile frame 12 is pulled alongside the bale by a tractor (not shown) being hitched to a front tongue 60 of the mobile frame.

Extension of the actuator 34 pivots the pickup 32 upwardly, raising of the tine bars 48, 50 to above the front portion of the frame 12 with the pickup 32 then at a generally upright bale-discharging position. As the pickup 32 approaches such position, the bale rolls from the spaced tine bars 48, 50, down the inner ramp-defining structure 36 of the pickup 32 and onto the mobile frame 12 such that the bale is transferred onto the front portions of the right and left longitudinal beams 20A, 20B of the frame.

As illustrated in FIGS. 1, 2 and 5-7, the bale pushing mechanism 16 of the apparatus 10 is mounted at the front end of the elongated mobile frame 12 adjacent its front end beam 22A for reciprocal movement toward and away from the rear end beam 22B of the frame. More particularly, the bale pushing mechanism 16 includes a slidable pusher 62 and an actuator 64.

The pusher 62 of the bale pushing mechanism 16 extends transversely between the longitudinal beams 20A, 20B of the frame 12. The pusher 62 is composed of an upper mast 66 and a lower carriage 68 rigidly connected to and supporting the mast 66. The upper mast 66 has an inverted U-shaped construction and projects upright above the mobile frame 12 with a slight forward tilt for receiving and engaging the lower front side of a bale transferred onto the forward portions of the longitudinal beams 20A, 20B of the frame 12. The lower carriage 68 also has an inverted U-shaped construction. The carriage 68 has a top horizontal member 70 upon which the mast 66 is rigidly mounted and a pair of right and left downwardly extending legs 72A, 72B having pairs of fore-and-aft spaced rollers 74 rotatably mounted to their outer and lower sides.

The longitudinal beams 20A, 20B of the mobile frame 12 at their forward portions have respective recesses 76 formed along their inner sides which define a pair of right and left tracks 78A, 78B. The rollers 74 of the pusher carriage 68 rest upon and travel along the tracks 78A, 78B as the pusher 62 is reciprocally moved forward and aft in the longitudinal direction of the mobile frame 12. As can be readily seen in FIGS. 1 and 2, the tracks 78A, 78B terminate a short distance to the rear side of the pickup 32 so as to ensure that each bale is moved rearwardly by the pusher 62 a sufficient distance to place it clear of the next bale to be transferred to the forward portion of the longitudinal beams 20A, 20B.

The actuator 64 of the bale pushing mechanism 16 is preferably an extendible and retractible hydraulic cylinder having a cylinder portion 80 and a piston rod portion 82. The cylinder portion 80 of the actuator 64 extends below the frame 12 between and supported by a pair of forward and aft spaced cross braces 84, 86 which extend between and are rigidly connected to the longitudinal beams 20A, 20B and the undercarriage structures 30, respectively. The piston rod portion 82 extends from the cylinder portion 80 and is pivotally connected at a forward end to a lower end of a bracket 88 extending downwardly from and rigidly attached to the top horizontal member 70 of the pusher carriage 68.

The pusher 62 is reciprocally movable by selected operation of the actuator 64. Extension of the piston rod portion 82 from the cylinder portion 80 of the actuator 64 moves the pusher 62 along the tracks 78A, 78B through a forward return stroke to adjacent the front end beam 22A of the mobile frame 12 and the front side of the pickup 32 so as to place the pusher 62 at a forward position. In such position of the pusher 62, a bale can be deposited onto the forward portions of the longitudinal beams 20A, 20B of the frame 12 immediately to the rear of the upper mast 66 of the pusher 62. Retraction of the piston rod portion 82 into the cylinder portion 80 of the actuator 64 pulls the pusher 62 along the tracks 78A, 78B through a rearward working stroke to adjacent the forward cross brace 84 and the rear side of the pickup 32 so as to move the bale rearwardly along the longitudinal beams 20A, 20B of the frame 12 through a distance greater than the axial length of the bale allowing transfer of a succeeding bale from the pickup 32 to the forward portions of the longitudinal beams 20A, 20B. In such manner, each bale deposited by action of the pickup 32 on the forward portions of the longitudinal beams 20A, 20B are pushed rearwardly through a distance somewhat more than one bale length until a row of end-to-end bales B has been accumulated on the pair of longitudinal beams 20A, 20B as seen in FIG. 9.

Referring to FIGS. 1, 2 and 8-10, the bale unloading mechanism 18 of the apparatus 10 is pivotally mounted to the elongated frame 12 about a longitudinal axis for movement between a lowered position and a raised tilted position. More particularly, the bale unloading mechanism 18 includes a longitudinal lift gate 90 pivotally mounted to the frame 12 and a plurality of actuators 92 for pivoting the lift gate 90 between a lowered position as shown in solid line form in FIGS. 8-10 and a tilted raised position as shown in dashed line form in FIG. 10.

The lift gate 90 is composed of a pair of outer longitudinal tubular members 94A, 94B and a pair of inner longitudinal flat member 96A, 96B being smaller in cross section than the outer members 94A, 94B. The outer and inner members 94A, 94B and 96A, 96B extending generally parallel to one another and rigidly attached to forward 25 and rearward pairs of cross members 98, 100. As seen in FIGS. 1 and 8, the forwardmost one of the cross members 98 is composed of a pair of separate laterally-spaced right and left cross member portions 98A, 98B which are attached respectively to right outer and inner members 94A, 96A and left outer and inner members 94B, 96B. The laterally-spaced cross member portions 98A, 98B define a gap 99 between them through which can pass the bracket 88 of the bale pushing mechanism 16 to and from between the respective inner members 96A, 96B of the bale unloading mechanism 18 during operation of the bale pushing mechanism 16. The right one of the outer longitudinal tubular members 94A is pivotally mounted by semi-circular brackets 102 to the front and rear cross beams 24A, 24B adjacent and inwardly of the right one of the longitudinal beams 20A. The lift gate 90 thus pivots about a longitudinal axis extending parallel to and closer along the right longitudinal beam 20A than to the left beam 20B.

The actuators 92 of the bale pushing mechanism 16 are preferably extendible and retractible hydraulic cylinders having respective cylinder portions 104 pivotally connected to the underside of the left longitudinal beam 20B. The actuators 92 also have piston rod portions 106 pivotally connected to respective lower ends of crank arms 108 rigidly attached to and extending downwardly from the right outer longitudinal tubular member 94 of the lift gate 90. Retraction of the piston rod portions 106 into the cylinder portions 104 of the actuators 92 rotates the crank arm 108 in one direction and thereby pivots the lift gate 90 upwardly from its lower bale-supporting position to its tilted raised bale-discharging position for lifting and rolling the row of accumulated bales B off one side of the frame 12 over the right one of the longitudinal beams 20A all at the same time. Extension of the piston rod portions 106 from the cylinder portions 104 of the actuators 92 rotates the crank arm 108 in the opposite direction and thereby pivots the lift gate 90 back down to its lower bale-supporting position where it is positioned for underlying another row of bales deposited on the frame 12.

The longitudinal beams 20A, 20B having smooth upper surfaces 110 capable of receiving and supporting the bales thereon and permitting sliding of the bales rearwardly without obstruction by anything, such as stops or pivotal dogs as in the prior art, that might penetrate into the bales and cause tearing of plastic covers applied around the bales. It should be noted that the lift gate 90 is disposed below the level of the upper surfaces 110 of the beams 20A, 20B and that the inner longitudinal flat members 96A, 96B provide some support for the bales as they slide rearwardly so as to assist in preventing any of the cross braces 86, 88 or cross members 98, 100 from interfering with bale movement.

The large round bale handling apparatus 10 is thus operable to pickup large round bales one at a time from a field and form them into an end-to-end row on the frame 10 as the apparatus 10 is towed across the field behind a tractor or the like. Further, the actuators 34, 64 and 92 of the apparatus 10 are connected in flow communication within a suitable hydraulic system (not shown) and operated from the tractor by an operator using suitable hydraulic controls (not shown).

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. A large round bale handling apparatus, comprising:
   (a) a mobile frame with a pair of elongated laterally-spaced longitudinal beams having upper surfaces for receiving and supporting large round bales in a row and for permitting sliding of bales rearwardly without obstruction by anything that might penetrate into the bales and cause tearing of plastic covers when applied around the bales;
   (b) a bale pickup mechanism pivotally mounted to the mobile frame adjacent one end and along one side thereof and operable for undergoing movement between a lower bale-engaging position and an upright bale-discharging position for depositing a bale onto said beams adjacent said one end of said frame;
   (c) a bale pushing mechanism movably supported at said one end of the mobile frame and operable for undergoing reciprocal movement through working and return strokes to move each bale deposited onto said beams through a distance greater than an axial length of a bale thereby allowing transfer of a succeeding bale from said pickup to said beams of said frame and movement thereof until a row of bales has been accumulated on said beams of said frame; and
   (d) a bale unloading mechanism pivotally mounted to said mobile frame and operable for undergoing movement between a lowered position underlying the row of bales on said frame and a tilted raise position for unloading the row of accumulated bales from said longitudinal beams of said frame so as to discharge the bales all at the same time therefrom, said bale unloading mechanism including an elongated lift gate pivotally mounted to said frame between said longitudinal beams thereof and disposed below the level of said upper surfaces of said longitudinal beams when in said lower position so as to avoid obstruction of movement of the bales along said longitudinal beams, said bale unloading mechanism also including a plurality of actuators connected between said lift gate and said frame and being operable for pivoting said lift gate between said lowered position underlying the row of bales on said frame and said tilted raised position.

2. The apparatus of claim 1 wherein said bale pickup mechanism includes:
   a pickup pivotally mounted adjacent said one end and along said one side of said mobile frame; and
   an actuator interconnecting said pickup and said frame and operable for moving said pickup between said lower bale-engaging position and said upright bale-discharging position.

3. The apparatus of claim 1 wherein said pickup includes:
an inner structure; and
an outer structure for receiving and supporting a bale when said pickup is at said bale-engaging position, said outer structure being rigidly attached to and extending outwardly from said inner structure, said inner structure being pivotally mounted to said frame and providing a ramp for transfer of a bale from said outer structure to said longitudinal beams as said pickup is moved to said upright bale-discharging position.

4. The apparatus of claim 3 wherein said inner structure includes a shaft having opposite ends and a pair of sleeves attached to one of said longitudinal beams and rotatably mounting said shaft at said opposite ends thereof.

5. The apparatus of claim 4 wherein said inner structure also includes a pair of spaced frame members rigidly connected to said shaft and extending outwardly in transverse relation thereto.

6. The apparatus of claim 5 wherein said outer structure includes an end bar and a pair of fore-and-aft extending and laterally spaced inner and outer tine bars rigidly attached to said end bar and to said frame members of said inner structure.

7. The apparatus of claim 6 wherein said inner structure also includes a plurality of reinforcing bars interconnecting said inner tine bar with said shaft, said reinforcing bars being slanted to connect with said shaft at a location displaced from where they connect with said inner tine bar to ensure that a bale being transferred across and in contact with said reinforcing bars from said outer structure to said longitudinal beams of said frame will tend to move away from a bale already supported on said longitudinal beams.

8. The apparatus of claim 3 wherein said actuator of said bale pickup mechanism is pivotally connected at opposite ends to one of said longitudinal beams and to one of said inner and outer structures of said pickup and is retractible and extendible for moving said pickup between said lower bale-engaging position and upright bale-discharging position.

9. The apparatus of claim 1 wherein said bale pushing mechanism includes:
a pusher slidably mounted adjacent one end of said frame between said longitudinal beams for reciprocal movement toward and away from an opposite end of said frame; and
an actuator connected between said pusher and said frame and being extendible and retractible for moving said pusher along said beams through working and return strokes through a distance greater than the axial length of a bale for allowing transfer of a succeeding bale from said bale pickup mechanism to said longitudinal beams of said frame until a row of bales has accumulated on said longitudinal beams.

10. The apparatus of claim 9 wherein said pusher includes an upper mast and a lower carriage supporting said mast, said mast projecting upright above said beams for engaging a bale transferred onto said longitudinal beams of said frame.

11. The apparatus of claim 10 wherein:
said longitudinal beams have a pair of tracks defined thereon; and
said carriage has a plurality of rollers for mounting said pusher on said tracks for reciprocal movement in the longitudinal direction of said beams of said frame.

12. The apparatus of claim 11 wherein said actuator of said bale pushing mechanism is supported below said frame and connected to said carriage of said pusher.

13. The apparatus of claim 1 wherein said lift gate includes a pair of outer longitudinal members laterally spaced from and extending generally parallel to one another.

14. The apparatus of claim 13 wherein one of said outer longitudinal members is pivotally mounted to said frame adjacent and inwardly of one of said longitudinal beams such that said lift gate pivots about a longitudinal axis extending parallel to and closer along said one of said longitudinal beam than to the other thereof so as to discharge the row of accumulated bales from said frame over said one longitudinal beam.

15. The apparatus of claim 14 wherein said lift gate further includes crank arms rigidly attached to and extending downwardly from said one outer longitudinal member.

16. The apparatus of claim 15, wherein said actuators of said bale unloading mechanism are pivotally connected at opposite ends to said other of said longitudinal beams and to said crank arms and are retractible and extendible for moving said lift gate between said lower bale-supporting position and tilted raised bale-discharging position.

* * * * *